United States Patent [19]

Hadek et al.

[11] 4,061,834

[45] Dec. 6, 1977

[54] DURABLE ANTISTATIC COATING FOR POLYMETHYLMETHACRYLATE

[75] Inventors: Vaclav Hadek; Robert B. Somoano, both of La Canada; Alan Rembaum, Altadena, all of Calif.

[73] Assignee: The United States of America as represented by the Administrator of the National Aeronautics and Space Administration, Washington, D.C.

[21] Appl. No.: 692,284

[22] Filed: June 3, 1976

[51] Int. Cl.² .......................... B05D 5/06; C09K 3/16
[52] U.S. Cl. .................................... 428/522; 428/922; 428/411; 96/87 A; 260/DIG. 15; 427/164
[58] Field of Search ....................... 96/87 A; 264/343; 427/163, 164; 260/DIG. 19, DIG. 20, DIG. 15; 8/130.1; 428/922, 411, 522

[56] References Cited

U.S. PATENT DOCUMENTS

| 2,393,863 | 1/1946 | Myers | 106/13 |
|---|---|---|---|
| 2,494,054 | 1/1950 | Nadeau | 96/87 A |
| 2,879,244 | 3/1959 | Coler | 260/DIG. 20 |
| 2,993,022 | 7/1961 | Coler | 427/221 X |
| 3,190,763 | 6/1965 | Schleede | 260/DIG. 19 |
| 3,352,626 | 11/1967 | Fujita et al. | 8/130.1 |
| 3,655,857 | 4/1972 | Bohrer et al. | 264/182 X |
| 3,679,355 | 7/1972 | Yamaguchi | 8/130.1 |
| 3,910,867 | 10/1975 | Bentz | 260/DIG. 19 |
| 3,928,528 | 12/1975 | Orito | 264/182 X |

Primary Examiner—Ronald H. Smith
Assistant Examiner—S. Silverberg
Attorney, Agent, or Firm—Monte F. Mott; Wilfred Grifka; John R. Manning

[57] ABSTRACT

A durable antistatic coating is achieved on polymethylmethacrylate plastic without affecting its optical clarity by applying to the surface of the plastic a low molecular weight solvent having a high electron affinity and a high dipole moment such as acentonitrile or nitromethane alone or in the presence of photopolymerizable monomer. The treated polymethylmethacrylate plastic can then dissipate most of the induced electrostatic charge and retains its optical clarity. The antistatic behavior persists after washing, rubbing and vacuum treatment.

8 Claims, No Drawings

DURABLE ANTISTATIC COATING FOR POLYMETHYLMETHACRYLATE

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to surface treatment of plastics and, more particularly, to the formation of a durable antistatic coating on the surface of acrylic resins such as polymethylmethacrylate.

2. Description of the Prior Art

A very desirable property is exhibited by solid acrylic polymers, such as crystal clarity, high impact strength, formability, and resistance to sunlight and weather in most chemicals has led to widespread use in military and civilian applications, especially since these polymers have become available in transparent, translucent and brightly colored forms. Acrylic sheet is the standard transparent material for canopies, windows, instrument panels, searchlight and landing light covers on aircraft. Acrylics are finding increasing use in automotive fields, as a sign material for faces and letters, display and demonstration models, vending machines and industrial and architectural applications such as windows, safety shields, etc.

The problem with acrylic plastics is that an electrostatic charge easily builds up on the surface of the article. A particularly serious problem is that a charge can build up on aircraft canopies or windows during flight to such an extent as to cause fracture. The presently known and available antistatic treatments are neither sufficiently durable nor do they provide sufficient charge dissipation without loss of optical clarity. Treatment of the acrylic surface with polyionenes which were previously found to act as antistatic agents because of their high positive charge density was found to be unsuccessful in the case of acrylic polymers. A commercial antistatic agent such as DuPont's Zelec-NK was found to disspate static electricity and yield good clarity when applied to the surface of acrylic articles. However, the agent could be easily removed by rubbing or washing. Strong electron acceptors such as tetracyanoquinodimethane (TCNQ), tetracyanoethylene (TCNE), and dinitrobenzene were studied and were found to form charge transfer complexes with polymethylmethacrylate which increased the conductivity markedly and dissipated static electricity. However, these agents severely attacked the surface yielding poor optical clarity.

SUMMARY OF THE INVENTION

A durable antistatic is provided on the surface of polymethylmethacrylate articles by applying to the surface a low molecular weight solvent having a high electron affinity and a high dipole moment for a period of at least about one minute followed by washing with water and drying the surface. Treatment of times of up to about thirty minutes or more may be utilized depending on the nature of the acrylic. The solvent may be applied by dipping, brushing, spraying or immersing the article in a bath of solvent. Treated articles having the best optical clarity are produced by this immersion technique. Articles having best optical clarity are produced when the temperature of the solvent is maintained below 40° C and preferably from 10° C to 30° C. Surface treatment by immersion in solvent is found to result in a retention of about at least 0.05 percent by weight of solvent and typically about 0.1 percent solvent after five to thirty minutes at 10°-30° C.

The solvent may also be applied as a viscous photopolymerizable monomer and photoinitiator that polymerizes to form an antistatic film having good optical clarity. The photopolymerizable system comprises a liquid lower alkyl methacrylate ester such monomeric methymethacrylate containing from 5-20 weight percent lower alkyl methacrylate ester such as polymethylmethacrylate, 0.1 to 3% by weight of a photoinitiator such as methoxybenzoin and 0.5 to 15% by weight of the solvent.

The acrylic surfaces treated in accordance with the invention are found to dissipate from 50 to 70% of an induced electrostatic charge within a short time span of approximately 60 seconds while retaining optical clarity. The acquired antistatic behavior persisted after washing, rubbing or vacuum treatment. This result was obtained with as little as 0.1%, by weight, of the solvent retained in the treated material.

These and many other features and attendant advantages of the invention will become apparent as the description proceeds.

DESCRIPTION OF THE PREFERRED EMBODIMENTS

The process of the invention is applicable to solid polymerized articles of acrylic esters such as those of the formula $CH_2=C(CH_3)-COOR$ in which R is methyl, ethyl, n-butyl, isobutyl or combinations thereof and particularly the methylmethacrylate and ethylmethacrylate polymers containing at least 90% of these esters. The treated article may be unoriented or may be uniaxially or biaxially oriented materials in molded, cast or extended form.

The solvent treating agent must have a low molecular weight below about 200, preferably below 70, have high electron affinity and preferably also be a polar material having a high dipole moment. Preferred solvents are acetonitrile and nitromethane. The solvent is applied in excess to the surface for at least one minute until at least 0.05% by weight of solvent penetrates into the surface.

While not being bound by theory it is believed that the static dissipating characteristics of the solvents are due to their low molecular weight which permits penetration into the acrylic ester matrix, their high electron affinity which permits weak charge transfer complex formation and their high dipole moment and polarizability effects associated with the solvent molecules screen the intermolecular potential barriers and provides some degree of charge transport to assist in neutralizing the induced charge.

The following experiments were conducted on 79 mil thick biaxially oriented Lucite (polymethylmethacrylate) discs. The discs were dipped for five to thirty minutes in either cold (room temperature, 20° C) or hot (30°-40° C) solvent and then removed, washed with water and dried overnight in a vacuum chamber before testing.

The primary method of characterization was the measurement of the static charge dissipation in an environment of known humidity. Static charge was determined using a Keithley Static Detecting Head with a high impedance electrometer. Static charge was induced primarily by triboelectric charging (usually with fresh wool).

Any increase in electrical conductivity of PMM upon treatment was detected by measuring both the volume and surface resistivities in a guarded and shielded configuration. This technique also allows to distinguish between volume and surface treatments. The weight gain upon treatment, was determined by TGA and Kahn balance studies as functions of temperature and time. The thermal stability of the antistatic agent was elucidated in these experiments. Further studies of stability involved subjecting the treated PMM to prolonged pumping in vacuo, at various temperatures and times, as well as stringent washing tests. UV-visible and IR spectra were used to evaluate the optical clarity of the treated plates and to elucidate the nature of the static dissipation mechanism. The presence and amount of solvent present on the plastic discs were determined by vapor pressure and mass spectrometry studies. The high voltage characteristics of the treated plates were studied using a 120 KV generator.

Table 1 below summarizes the charge dissipating characteristics obtained with a number of solvents.

TABLE I

Effects of Various Solvents on PMM

| Solvent | Dissipation of Static Charge | Optical Clarity |
|---|---|---|
| acetonitrile | yes | good |
| nitromethane | yes | good |
| propanol | no | good |
| DMSO | yes | bad |
| benzene | no | bad |
| ethyl acetate | no | bad |
| ethylene glycol | no | fair |
| acrylonitrile | no | bad |

The antistatic behavior or the acetonitrile sample persisted after 4 months. This technique was uncessful with polycarbonate since efficient charge dissipation was always accompanied by poor optical clarity.

The volume and surface resistivity of the treated polymethylmethacrylate (PMM) are virtually the same as untreated PMM as shown in Table II which follows.

TABLE II

Volume ($\rho_v$) and Surface ($\rho_s$) Resistivity of PMM Samples

| Sample | $\rho_v$ ($\Omega$) | $\rho_s$ ($\Omega$) |
|---|---|---|
| PMM | $4 \times 10^{17}$ | $4 \times 10^{17}$ |
| PMM + CH$_3$CN | $2 \times 10^{17}$ | $4-5 \times 10^{17}$ |
| PMM + CH$_3$NO$_2$ | $2.3 \times 10^{17}$ | $4.2 \times 10^{17}$ |
| PMM + CH$_3$CN + TCNQ | $8 \times 10^{15}$ | $3 \times 10^{16}$ |

Various types of treatment of PMM with acetonitrile were attempted as shown in Table III.

TABLE III

Summary of the Effects of Various Treatments on PMM with Acetonitrile

| Treatment | Static Charge Dissipating | Optical Clarity |
|---|---|---|
| Submersion in | | |
| (a) hot CH$_3$CN | yes | bad |
| (b) cold CH$_3$CN | yes | good |
| Painting | yes | bad |
| Spraying | yes | bad |
| Vapor Treatment | | |
| (a) cold vapors | no | good |
| (b) hot vapors | no | good |

As shown in Table III, submersion in cold acetonitrile appears to provide the best results from experiments conducted to date. The PMM treated by submersion in cold acetonitrile was found to retain its static charge dissipating characteristics even after prolonged pumping in vacuo at room temperature or at 60° C. At higher temperatures, the acetonitrile tended to be removed from the surface of the PMM article.

A viscous pre-polymer was prepared by stirring overnight 100 grams of freshly distilled monomeric methyl methacrylate with 10 grams of high molecular weight poly methylmethacrylate (M.W. of about 1,000,000). 1% by weight of methoxybenzoin is then dissolved in the mixture along with the antistatic solvent. A 3-5 mil thick layer was poured onto a commercial sample of solid polymethylmethacrylate (PMM) and irradiated for one-half to one hour under a 450 W Hanovia Mercury Arc lamp. A summary of the materials used (and their percent, by weight) and the optical and static charge dissipation results are given in Table IV.

Table IV.

Photopolymerized Coatings on Polymethylmethacrylate

| Coating Material and percent, by weight | Percent Dissipation* | Optical Clarity |
|---|---|---|
| Hydroxyethyl Methacrylate (~ 50%) | 85 - 96% | fair |
| CH$_3$CN (~ 10%) | 89 - 93% | good |
| DMSO (~ 10%) | 100% | poor |
| CH$_3$NO$_2$ (10%) | 0% | good |
| Acrylonitrile (10%) | ~ 0% | good |

*Relative to the amount of voltage induced on an untreated sample.

Of the monomeric materials tested, methacrylic acid appears quite promising. It dissipates static charge, has good optical clarity, and is copolymerized into the sheet so that it should be quite durable. The durability and thermal stability of this coating is under study. Additional studies of the methacrylic (MMA) acid coating on PMM have been carried out and are summarized in Table V. The cause of the poor static dissipation characteristics for the samples with 5 and 10% MMA in the coatings is unknown.

TABLE V.

Short Term Stability Studies of Pohotopolymerized Coatings of Methyl Methacrylic Acid on Polymethylmethacrylate

| | Percent Dissipation of Static Charge | | |
|---|---|---|---|
| Percent, by Weight or MMA | After Pumping 2 hrs (R.H. = 18%)* | After Pumping 72 hrs (R.H. = 50%) | After 2 weeks R.H. = 16% |
| 1% | 82% | 82% | 89% |
| 1% | 88% | 88% | 92% |
| 5% | 18% | 18% | 0% |
| 10% | 0% | 0% | 0% |
| 20% | 55% | 55% | 43% |

*R.H. = relative humidity

Partial reaction of the MMA coatings with NaOH to improve the static dissipation was found to be ineffective. The surface resistivity of the coating ($\rho_s \sim 10^{15}\Omega$-cm) is less than that of bulk PMM ($\rho_v \sim 10^{17}\Omega$-cm), but is still too high to dissipate static charge by ordinary conduction mechanism.

All of the samples treated by the immersion of photopolymerization technique were subjected to high voltage (HV) to determine if the treated sheets were more susceptible to dielectric breakdown. Voltages ~ 90 to 120 kV (Fields ~ 6 × 10 V/cm) were applied to the sheets and no evidence of failure was found.

Two techniques have been found which show promise of rendering PMM antistatic while preserving its optical clarity These techniques involve the immersion of PMM in cold solvents of high dipole moment or the incorporation of these solvents into suitable matrices which are then photopolymerized onto commercial PMM sheets. The coatings are durable, cannot be washed or pumped off. The nature of the static charge dissipation mechanism is unknown. Spectroscopic studies do not reveal any evidence of charge transfer. It is possible that polarizability effects associated with the solvent molecules screen the intermolecular potential barriers and provdides some degree of charge transport to assist in neutralizing the induced charge.

It is to be realized that only preferred embodiments of the invention have been described and that numerous substitutions, alterations and modifications are all permissible without departing from the spirit and scope of the invention as defined in the following claims.

What is claimed is:

1. A method of providing a durable, optically clear, transparent, antistatic coating on the surface of a transparent solid polymethacrylate article comprising the steps of:

applying to the surface of the article at a temperature of no more than 40° C a low molecular weight, polar, organic solvent having high electron affinity selected from the group consisting of nitromethane or acetonitrile, to form an antistatic coating comprising a surface layer of said article having at least 0.05% by weight of said solvent retained therein; and drying said surface.

2. A method according to claim 1 in which the article is a solid polymeric methacrylate ester selected from methyl, ethyl, propyl, butyl, or mixtures thereof.

3. A method according to claim 2 in which the solid polymeric ester is a polymethylmethacrylate.

4. A method according to claim 1 in which the article contains at least 0.1% by weight of the solvent.

5. A method according to claim 1 in which the solvent is applied at room temperature.

6. A method according to claim 5 in which the solvent is applied to the article by immersion of the article in the solvent.

7. A method according to claim 1 in which the solvent is acetonitrile.

8. An article produced according to the method of claim 1.